3,336,422
PROCESS FOR PRODUCING THIOPHOSPHATE ESTERS
Willard D. Peterson, Pasadena, Calif., assignor to American Potash & Chemical Corporation, Los Angeles, Calif., a corporation of Delaware
No Drawing. Filed June 18, 1964, Ser. No. 376,242
20 Claims. (Cl. 260—975)

The present invention relates to new and useful organic thiophosphate esters and is particularly concerned with the preparation of toxic thiophosphorous compounds.

Certain organic thiophosphate compounds enjoy utility as insecticides and the like. These compounds are particularly advantageous when used as insecticides since they hydrolyze and degrade rapidly whereby, in a matter of a few weeks after their application, they are substantially harmless, non-toxic phosphorous compounds.

In the past, certain difficulties have been experienced in preparing toxic thiophosphate compounds. Previously, when sufficiently high temperatures were employed to produce an acceptable rate of reaction, undesirable by-products sometimes formed. Catalyzed reactions generally required extensive refrigeration to control the vigorous reaction to prevent the formation of certain undesirable by-products.

In accordance with the present invention, the above described disadvantages have been overcome by a reaction employing certain critical parameters whereby very high yields of substantially pure compounds are achieved without the use of extreme reaction conditions.

Broadly, the present invention includes the first step of reacting a mixture of thiophosphonyl chloride with an alkanol and an acid acceptor in a manner which selectively replaces one chlorine atom by an alkoxy group. This reaction preferably is carried out in a solvent in the presence of a catalyst to give a substantially quantitative yield of the desired dichloro-O-alkylphosphorothioate.

The second step of this process is similar to the first using the product of the first step as one reactant. An acid acceptor and preferably a solvent and a catalyst are also used. An alkanol, which may or may not be the same as that used in the first step, is reacted with the product of the first step to produce a monochloro-O,O-dialkylphosphorothioate in substantially quantitative yields. The reactants and the conditions used in this step are slightly more severe than those in the first step.

Reaction of this monochloro-O,O-dialkylphosphorothioate in a third step with an alkali metal substituted phenate then provides the desired O-arene-O,O-dialkylphosphorothioate product.

To further illustrate Step I of the invention, the monoalkyl product, dichloro-O-alkylphosphorothioate, may be prepared, using calcium oxide as the acid acceptor, methanol as the alkanol, 6-nitroquinoline as the catalyst and xylene, as the solvent, according to the following equation:

STEP I $2PSCl_3 + CaO + 2CH_3OH \xrightarrow[\text{6-nitroquinoline}]{\text{xylene, 25° C.}}$
$2CH_3OPSCl_2 + CaCl_2 + H_2O$ In the foregoing reaction, calcium chloride apparently acts as a dessicant and absorbs the water of reaction, up to the calcium chloride hexahydrate. Preferably, the solid calcium chloride formed is filtered off either as formed during the reaction or after the reaction is complete. To achieve the best results, a total of 2 moles of CaO preferably are used for every mole of $PSCl_3$. This molar ratio varies, as explained more fully hereinafter, with the specific acid acceptor.

Step II of this invention, involving reaction of the monoalkyl product produced in the first step, is carried out using ethanol as the alkanol, barium oxide as the acid acceptor, and the same other reactants as described above, as follows to produce the dialkyl product:

STEP II $2CH_3OPSCl_2 + BaO + 2C_2H_5OH \xrightarrow[\text{6-nitroquinoline}]{\text{xylene, 25° C.}}$
$2(CH_3O)(C_2H_5O)PSCl + BaCl_2 + H_2O$ Generally, a total of 1 mole of BaO is used for each mole of $CH_3OPSCl_2$.

In Step III, the xylene phase from the second step which contains the dialkyl product, is further reacted by contacting it with an aqueous phase containing an alkali metal phenate, according to the following equation, to produce the desired toxic thiophosphorous product:

STEP III

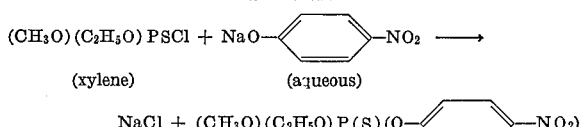

The solvent can be removed from the product by conventional procedures such as distillation, fractional crystallization and the like. Alternatively, the product may be retained in the solvent phase for shipment and use in that form, for example, as an insecticide. If the product is not to be separated from the solvent phase, only sufficient solvent is used in the reactions whereby the product is present there in quantities amounting to about 50 to 90%, by weight. The use of only that amount of solvent necessary to produce such a product concentration obviates the necessity for concentrating the solvent phase.

It is possible to conduct the entire process of this invention at room temperatures whereby no special refrigeration apparatus is required. However, since some of the reactions are exothermic, moderate cooling may be necessary to maintain the reaction mixture at a constant temperature. At room temperature, the reactions are smooth and well-controlled, therefore precise, critical and constant control of the reaction is not necessary. Since the reactions are rapid, long hold-up times are not necessary to complete the reaction. Operation of the process, therefore, on a semi-continuous, continuous or batch basis is possible.

The reactions which produce the mono- and dialkylphosphorothioate (Step I and Step II) preferably are carried out under anhydrous conditions, while the operation wherein the O-arene-O,O-dialkylphosphorothioate is produced (Step III), may be carried out in the presence of an aqueous phase.

Generally, in Steps I and II, the acid acceptor is a solid material which disperses throughout the reaction mixture. Since the solid dissolves as it reacts, an excess of acid acceptor is not present at any region in the reaction mixture.

If desired, Step II may be carried out using a refrigerated system wherein the dichloro product of Step I is reacted with an alkali metal alcoholate, generally sodium alcoholate. If such an alkali metal alcoholate is used, reaction temperatures should not be allowed to exceed about 10° C. and preferably should be maintained below about 0° C.

The reaction temperatures in the preferred procedure in Step I range from 0° C. or even lower up to about 80° C., or higher, as may be convenient. Since the reactions in all steps proceed smoothly at room temperatures, for example, between about 20° C. and about 30° C., operation at such temperatures avoids the necessity for use of complicated and difficult-to-control temperature regulating means. Because of the ease and simplicity of operating at ambient temperatures, it is preferred to operate each step of the process at temperatures which are generally between about 10° C. and 45° C.

An increase in temperature produces a corresponding increase in the rate of reaction up to a temperature of about 60° C., at which point competing undesirable side reactions begin to take place to the extent that the product yield is reduced and the product becomes contaminated with by-products.

The process of this invention is flexible with respect to selection of specific reactants, catalysts, solvents, and reaction conditions. For example, it is possible to employ different, or mixtures of different, catalysts and acid acceptors in each of Step I and Step II. Also, different, or mixtures of different, solvents can be used at different stages throughout the reaction.

Preferably, to achieve optimum yields and reaction rates, the acid acceptors, the solvent and catalyst are balanced against one another and the alkanol reactant. In choosing a suitable solvent, stronger proton acceptors such as nitrobenzene or chlorobenzene should be employed with weaker acid acceptors, such as CaO or Ca(OH)$_2$. Furthermore, weaker proton acceptors such as, for example, benzene, or electron donors such as ethers, ketones or alcohols are employed with stronger acid acceptors such as BaO, Li$_2$O and Ba(OH)$_2$ are used. The catalysts used are generally weak electron donors.

The reasons why these acid acceptor solvents and catalysts produce the best results when selected in accordance with the above criterion are not fully understood at this time. However, the results obtained demonstrate their efficacy.

The process of this invention also enables the preparation of a chloro-O,O-dialkylphosphorothioate, wherein the alkyl groups are different such as, for example, chloro-O-methyl-O-isopropylphosphorothioate. The ability to produce a compound having two different alkyl groups in its structure provides a means whereby a finished product with varying specific properties can be produced.

It is known that both O,O-diethyl-O-(p-nitrophenyl)-phosphorothioate and O,O-dimethyl-O-(p-nitrophenyl)-phosphorothioate are effective insecticides having properties which vary, in some respects, from one another. It is possible, by use of the present process, to produce an O - ethyl - O - methyl-O-(p-nitrophenyl)phosphorothioate which has properties intermediate in some respects to either of these other two insecticides. Heretofore, it was considered to be impractical to attempt to produce compounds having two different alkyl groups, because of the difficulty in selectively controlling the introduction of the first alkyl group. Advantageously, the present process provides for the production of such compounds with relative ease.

In the instant specification, appended claims and following specific examples, all parts and percentages are by weight unless otherwise indicated. The following examples are set forth to further illustrate, not to limit, the invention, whereby those skilled in the art may understand better the manner in which he presen invention can be carried into effect.

The following example is illustrative of Step I of the process using calcium oxide as the acid acceptor, xylene as the solvent and acridine as the catalyst.

Example I

A solution of PSCl$_3$ (169 gms.—1 mole) in 600 ml. xylene is stirred at 25° C. while 112 gms. (2 moles) of CaO are added to produce an essentially colorless slurry. To this slurry are added 3.6 grams of acridine while stirring. The temperature of this slurry is maintained at 25–30° C. while 60 ml. (1.5 moles) of CH$_3$OH are added at a uniform rate over a period of 1 hour. The reaction vessel is cooled by cold tap water during this period. In the absence of agitation, the reaction mixture becomes brilliant yellow upon addition of CH$_3$OH, indicating the presence of the acridinium ion. Agitation returns the mixture to an essentially colorless state. The reaction mixture is stirred continually during the addition of the CH$_3$OH and for 2½ hours thereafter. The solids then are filtered out of the reaction mixture.

The filtrate contains only xylene, CH$_3$OPSCl$_2$ and acridine, while the filter cake contains a mixture of CaCl$_2$, CaO, and hydrates and alkolates of CaCl$_2$ and CaO. The filter cake is washed with xylene to remove traces of entrained CH$_3$OPSCl$_2$ and the wash liquor is combined with the filtrate.

Infra red analysis of the filtrate shows total conversion of PSCl$_3$ to CH$_3$OPSCl$_2$ with no evidence of (CH$_3$O)$_2$PSCl formation. Complete consumption of PSCl$_3$ is demonstrated by the absence of absorption at 13.3 microns.

The complete absence of (CH$_3$O)$_2$PSCl is shown by the lack of absorption at 15.05 and 15.25 microns, characteristic for this material.

The presence of CH$_3$OPSCl$_2$ is shown by absorption peaks at 13.87 microns and 14.22 microns.

Acridine is removed from the filtrate by treatment with 50 ml. portions of iced dilute hydrochloric acid (2–4% HCl by weight).

This example, when repeated using 1.5 moles of butanol, in place of CH$_3$OH, produces

(CH$_3$)$_2$CHCH$_2$OPSCl$_2$

The following example is illustrative of the effect of temperature and choice of acid acceptor on the reaction rate in Step I.

Example II

A 1 molar solution containing 1 mole of PSCl$_3$ in xylene is maintained at 25° C. while 2 moles of calcium hydroxide are added. An 0.02 mole amount of acridine is added to this mixture. The temperature of the stirred reaction mixture is maintained at about 25° C. while 1.25 moles of methanol are added to the mixture. The reaction is complete in 2 hours and gives substantially quantitative yields of CH$_3$OPSCl$_2$.

This example, when repeated using 2 moles of calcium oxide in place of the 2 moles of calcium hydroxide, gives substantially quantitative yields of CH$_3$OPSCl$_2$ in 4 hours.

The reaction of this example, when repeated at a temperature of 40° C. using calcium oxide, is substantially complete in about 1 hour.

The following example illustrates the reaction of Step I when carried out in (CH$_3$O)$_2$PSCl.

Example III

One mole of PSCl$_3$, in a 1 molar solution of PSCl$_3$ in (CH$_3$O)$_2$PSCl, is admixed with 2 moles of calcium oxide and 0.02 mole of acridine. The temperature of the reaction mixture is maintained at about 25° C. while 1.25 moles of methanol are added during 40 minutes at a uniform rate. The reaction is complete in a period of 2 hours to give substantially quantitative yields of CH$_3$OPSCl$_2$.

This example, when repeated using 1.25 moles of ethanol in place of methanol, gives substantially quantitative yields of CH$_3$CH$_2$OPSCl$_2$.

This example, when repeated using 2 moles of calcium hydroxide in place of the 2 moles calcium oxide, is complete in 1 hour and gives about a 99% yield of CH$_3$OPSCl$_2$.

This example, when repeated using 2 moles of calcium oxide as the acid acceptor but at a temperature of about 10° C., proceeds slowly and requires about 7 hours for its completion.

Example IV

A 1 mole quantity of PSCl$_3$, in a 1 molar solution of PSCl$_3$ in (CH$_3$O)$_2$PSCl, is admixed with 4 moles of calcium oxide and 0.025 mole of quinaldine. The temperature of this mixture is maintained at about 25–30° C. while 1.25 moles of methanol are added. The reaction proceeds rapidly to give a 96% yield of $CH_3OPSCl_2$ in a period of about 1 hour.

This example, when repeated using 1.25 moles of octanol in place of methanol, produces $$(CH_3)_5(C)_2CH_2OPSCl_2$$

Example V illustrates the effect of using a different catalyst in Step I.

*Example V*

One mole of $PSCl_3$, in a 1 molar solution of $PSCl_3$ in $(CH_3O)_2PSCl$, is admixed with 2 moles of calcium hydroxide and 0.02 mole of quinoline. The temperature of the reaction mixture is maintained at about 20° C. while 1.40 moles of methanol are added. The reaction gives a 96% yield of $CH_3OPSCl_2$ in a period of about 2 hours.

This example, when repeated using 0.02 mole of diphenylphosphonimidotriphenyl phosphorane as the catalyst in place of quinoline, gives a 92% yield of $$CH_3OPSCl_2$$

in about 1 hour.

This example, when repeated using 1.40 moles of propanol in place of methanol and quinoline as the catalyst, produces a high yield of $(CH_3)_2CHOPSCl_2$.

The following example illustrates the effect of various solvents in Step I.

*Example VI*

A 1 mole quantity of $PSCl_3$, in a 1 molar solution of $PSCl_3$ in nitrobenzene, is admixed with 2 moles of calcium oxide, 0.02 mole of acridine and 1.25 moles of methanol. This reaction is substantially complete in a period of about 1½ hours to give a substantially quantitative yield of $CH_3OPSCl_2$.

This example is repeated 5 times substituting 5 different solvents for the nitrobenzene. In each case, a 1 molar solution of $PSCl_3$ in the solvent is used. Using chlorobenzene, a substantially quantitative yield of $CH_3OPSCl_2$ is achieved in a period of about 2 hours. A 96% yield of product is obtained in about 3¾ hours using benzene. The use of carbon disulfide results in an 80% yield of product in about 2½ hours. Using diethyl ether, about a 5 hour reaction time is required to produce a 90% yield of $CH_3OPSCl_2$. A 2½ hour reaction time produces a substantially quantitative yield of product when xylene is used as a solvent. Using diethyl ether as the solvent, the reaction is about 40% complete in 1 hour. When this example is repeated using diethyl ether as the solvent but omitting the acridine catalyst, the reaction is only about 10% complete after about 1 hour.

The following example illustrates the use of sodium carbonate in Step I.

*Example VII*

About 10.8 grams of sodium carbonate is mixed with about 100 ml. of a xylene solution containing 0.1 mole of $PSCl_3$. The resulting slurry is agitated at 25° C. while about 4.5 ml. methanol is added over a period of 1 hour. After 6 hours, approximately 70% of the $PSCl_3$ is consumed to generate $CH_3OPSCl_2$ and by-products, including pyrophosphate, as characterized by an infrared absorbing band in the vicinity of 10.5 microns. The estimated yield of $CH_3OPSCl_2$ is 45%. After an additional 16 hours, this yield of $CH_3OPSCl_2$ has increased to approximately 55% based on the $PSCl_3$ charge.

This example is repeated and about 0.01 mole of tributylamine is added prior to start of the methanol addition. After about 5 hours of agitation, the reaction mixture contains a 78% yield of $CH_3OPSCl_2$.

Comparable results are obtained when about 0.01 mole of N-ethylmorpholine is used in place of tributylamine.

In another example with even lower concentration (0.005 mole) of quinoline addition, the conversion to $CH_3OPSCl_2$ is about 93% after 2½ hours total reaction time. When (0.002 mole) of quinoline is employed, the yield is about 96% after 2 hours.

When hexane is used as solvent and with (0.002 mole) quinoline as catalyst, the $PSCl_3$ consumption is only 92% after 5 hours reaction time with $CH_3OPSCl_2$ yield of approximately 90%.

When $(CH_3O)_2PSCl$ is used as solvent and (0.0013 mole) quinoline is employed, the $(CH_3OPSCl_2)$ yield is approximately 90% after 1½ hours reaction time. The product contains approximately 4% $(CH_3O)_3PS$.

Example VIII is illustrative of the use of calcium oxide, magnesium oxide and calcium carbonate in Step I.

*Example VIII*

To 11 grams of $PSCl_3$ dissolved in 118 grams $(CH_3O)_2PSCl$ is added 4 grams of calcium oxide followed by addition of 0.15 ml. of quinoline. To the agitated slurry (at 25° C.) 2.9 ml. of methanol are added over a 5 minute period. After 3 hours, the $PSCl_3$ consumption is nearly complete to give an 85% yield of $CH_3OPSCl_2$.

When magnesium oxide (chemically equivalent amount) is employed in place of calcium oxide, the reaction rate is initially faster but stops almost completely after 35% of the $PSCl_3$ is reacted.

With calcium carbonate as acid scavenger, the conversion of $PSCl_3$ to $CH_3OPSCl_2$ is about 46% complete after 3 hours under similar reaction conditions.

The following example compares the use of sodium carbonate and potassium carbonate in Step I.

*Example IX*

A 1 molar solution containing 1 mole of $PSCl_3$ in xylene is maintained at 25° C. while 1 mole of sodium carbonate is added. To the stirred reaction mixture is added 0.01 mole of acridine followed by uniform addition of 1.3 moles of methanol over a 50 minute period. After 2 additional hours, the reaction solution contains a 90% yield of $CH_3OPSCl_2$ with about 5% $(CH_3O)_2PSCl$.

This example, when repeated using 1 mole of potassium carbonate in place of 1 mole of sodium carbonate, the yield of $CH_3OPSCl_2$ is 55% with about 15% $(CH_3O)_2PSCl$ and 5% of the trimethoxy derivative $(CH_3O)_3PS$.

The following example illustrates the sequential operation of Steps I and II.

*Example X*

200 ml. of a 1 molar solution of $PSCl_3$ in xylene is stirred at 20° C. with 0.4 mole of calcium hydroxide and 0.004 mole of acridine while 10 ml. of methanol is added slowly over a period of 1 hour. Continued stirring of the reaction mixture for another 45 minutes leads to substantially complete conversion of the $PSCl_3$ to $CH_3OPSCl_2$.

The reaction mixture is filtered and the filtrate, which is essentially a solution of $CH_3OPSCl_2$ in xylene, is further methoxylated by treatment with 0.8 mole of calcium oxide and 0.02 mole of acridine. The resulting mixture is agitated at 30° C. while 0.8 mole of methanol is added slowly during 3 hours. After further reaction for a total of 6½ hours, the $CH_3OPSCl_2$ is consumed to generate $(CH_3O)_2PSCl$ in approximately 86% yield as established by infrared analysis.

This example, when repeated using 6-nitroquinoline instead of acridine as the catalyst, gives similar results after about 5 hours in the second stage of methoxylation indicating the greater activity of this catalyst.

Repeating this example again using 0.004 mole of diphenylphosphonimidotriphenylphosphorane as the catalyst gives a reaction rate which is slightly higher than for 6-nitroquinoline.

This example, when repeated using 0.8 mole of ethanol instead of methanol in the second step, yields $(CH_3O)(CH_3CH_2O)PSCl$.

This example, when carried out using 0.2 mole of ethanol in the first step and 0.8 mole of ethanol in the second step yields $(CH_3CH_2O)_2PSCl$.

Repeating this example using 0.2 mole of butanol in the first step and 0.8 mole of butanol in the second step produces $[(CH_3)_2CHCH_2O]_2PSCl$.

The following example illustrates the removal of the reaction by-products part way through Step I.

*Example XI*

Methoxylation of a 1 molecular quantity of $PSCl_3$ in the absence of a solvent is carried out by adding a 1 molecular quantity of pulverized calcium oxide and 0.02 mole of quinaldine followed by slow addition of 1.1 moles of methanol to the agitated reaction slurry while maintaining the temperature between 5° C. and 15° C. After 1½ hours, 75% of the $PSCl_3$ is converted almost quantatively to $CH_3OPSCl_2$. Filtration of the reaction mixture and further treatment of the filtrate with calcium oxide and methanol leads to complete consumption of the remaining $PSCl_3$ and generation of more $CH_3OPSCl_2$. Under these reaction conditions, negligible amounts of trimethoxy derivative $(CH_3O)_3PS$ are produced and less than 5% of $(CH_3O)_2PSCl$.

The result indicates that the reaction products produced in the first step hinder the reaction in the second step.

The following example is illustrative of the use of various acid acceptors on Step II.

*Example XII*

To 100 ml. of a 1 molar solution of $CH_3OPSCl_2$ in xylene is added 0.0015 mole of acridine and 0.2 mole of powdered calcium oxide. To this agitated slurry held at 25° C. is added 8 ml. (0.2 mole) of methanol over a 10 minute period. After another hour of agitation, 30% of the $CH_3OPSCl_2$ is converted to $(CH_3O)_2PSCl$ without evidence of formation of $(CH_3O)_3PS$. The remaining 70% of $CH_3OPSCl_2$ is still in evidence, thus showing no side reactions.

Under substantially the same reaction conditions, but substituting barium oxide for calcium oxide, 70% of the $CH_3OPSCl_2$ is converted to $(CH_3O)_2PSCl$ with consumption of 90% of the original $CH_3OPSCl_2$.

When a mixture of 0.1 mole of calcium oxide and 0.1 mole of barium oxide is employed, there results a 75% conversion to $(CH_3O)_2PSCl$ with consumption of 80% of the original $CH_3OPSCl_2$.

When barium oxide is replaced by barium carbonate in equimolar amount, the reaction proceeds to only 10% conversion of the $CH_3OPSCl_2$ into $(CH_3O)_2PSCl$ after 5 hours reaction time.

Potassium carbonate in this example gives a reaction rate comparable to that of calcium oxide but results in a lower yield.

The reaction rate using sodium carbonate is about one half that obtained using calcium oxide.

Both cesium and rubidium carbonate give very high percentages of $(CH_3O)_2PS$ and hydrolysis by-products.

Barium hydroxide is very effective even in the absence of a catalyst. A 1 molar $CH_3OPSCl_2$ solution in xylene is treated with 2 mole equivalents of barium hydroxide and to the slurried system (at 25° C.) is added 1.6 mole equivalents of methanol. After 45 minutes, 86% of the $CH_3OPSCl_2$ has been consumed to generate a nearly quantitative (85%) yield of $(CH_3O)_2PSCl$.

The following example is illustrative of the preparation of chloro-O,O-dialkylphosphorothioate using methanolic caustic.

*Example XIII*

Thiophosphoryl chloride is chilled to −10° C., and to it is added two equivalents of methanol at a uniform rate during a 30 minute period while agitating the solution and holding its temperature at −10° C. by external cooling.

A solution of sodium hydroxide in methanol (15–23% NaOH by weight) is then introduced to the reaction mixture during a period of 3 hours while vigorously agitating the reaction mixture and holding its temperature at 0° to −20° C. by external cooling. A total of 2.06 equivalents of caustic is so added.

The reaction mixture is then diluted with enough tap water to dissolve the sodium chloride which has been formed by the reaction. The product is separated from the methanolic brine, and washed with an equal volume of water.

The product so obtained is chloro-O-O-dimethylphosphorothioate, refractive index $n_D^{20}$ 1.4801; the yield is 85–88%, based on thiophosphoryl chloride. The thiophosphoryl chloride is totally consumed.

As illustrated in the above examples, a large excess of acid acceptor favors high reaction rates, especially in the second stage of methoxylation. The rate of addition of alkanol and its concentration in the reacting system are primary controlling factors in regulating the quality of the product. If large amounts of alkanol are present, simultaneously with large amounts of acid acceptor, there is a tendency to generate the trimethoxylated derivative $(CH_3O)_3P=S$. Generally, excess acid acceptor is favored for both steps of alkoxylation.

As shown in the foregoing examples, increased amounts of acid acceptor and alkanol, based on the phosphorous compounds, are required in the second step as compared to those amounts required in the first step.

The presence of a small amount of an electron donor catalyst substantially increases the rate of reaction for the production of dichloro-O-alkylphosphorothioate and for the production of monochloro-O,O-dialkylphosphorothioate. Generally, it is preferred to increase the reaction rate in each of these steps by the use of an electron donor catalyst which is generally a teritary amine compound. However, where a highly active acid acceptor, such as barium hydroxide, is used, adequate reaction rates can be established without the use of a catalyst.

The catalysts used in the process are provided in small amounts ranging from a trace up to about 1% or more. While larger amounts of catalyst can be employed, no useful result is obtained by such a procedure.

Suitable catalysts for use in the present invention include, for example, pyridine, picoline, aozbenzene, N-methyl acetanilide, 4-cyanopyridine, quinoline, quinaldine, 6-nitroquinoline, 6-chloroquinoline, 8-nitroquinoline, 8-hydroxyquinoline, acridine, an alkyl and halo-substituted acridines, trialkylamines (trimethyl-, triethyl-, tributyl-) N,N-dialkylanilines (N,N-dimethyl-4-chloroaniline, N,N-diethyl-4-bromoaniline, N-octadecyl-N-decylaniline, 4-methoxy N,N-dimethylaniline, N,N-didecyl p-phenoxyaniline, N-decyl-N-benzylphenoxy aniline, diethyldinitroaniline), trialkyl and triaryl phosphines (triethylphosphine, triphenylphosphine) diphenylphosphonimidotriphenylphosphorane; metal complexes of 8-hydroxyquinoline (e.g., copper-8-hydroxyquinolate, nickel-8-hydroxyquinolate) N-decyl-N-p-phenoxylphenyloctamide, tribenzylamine; N,N-dimethylbenzylamine, N-substituted morpholines (e.g., N-ethylmorpholine; N-phenylmorpholine) N-substituted piperidines, e.g., N-phenyl piperidine; N(2,4-dinitrophenyl)piperidine; O-phenanthroline, the sodium salt of methyl orange, 2,3-dimethylquinoxaline and the like.

Those catalysts possessing the weaker electron donor characteristics favor faster reactions, especially in systems employing calcium and magnesium oxides or hydroxides as the acid scavenging agents. Examples of such catalysts include, for example diphenylphosphonimidotriphenylphosphorane, 6-nitroquinoline and copper oxinate.

Relatively stronger electron donor catalysts are favored for use in systems employing such acid scavenging agents as sodium carbonate, and potassium carbonate.

According to the present invention, suitable acid acceptors include the oxides and hydroxides of barium, lithium, calcium and magnesium and the corresponding partial hydrates of these compounds. The preferred acid acceptors for the first step are the oxides, with calcium oxide being preferred. Barium hydroxide is the preferred acid acceptor for the production of the monochloro-O,O-dialkylphosphorothioate.

The quantity of acid acceptors employed in the production of dichloro-O-alkylphosphorothioate and monochloro-O,O-dialkylphosphorothioate varies from one specific acid acceptor to another. Since the acid acceptors may react not only with the hydrogen chloride which is evolved during the reaction but also with the water produced in the reaction, it is necessary to supply a sufficient amount of acid acceptor to combine with both the hydrogen chloride and the water. For example, it has been found that it is necessary to supply at least 2 moles of calcium oxide for every 1 mole of $PSCl_3$ to obtain a satisfactory reaction rate in the production of the dichloro-O-alkylphosphorothioate compound. Likewise, at least 2 moles of lithium oxide and at least 4 moles of magnesium oxide are required to produce the optimum yield of dichloro-O-alkylphosphorothioate compound, while only 1 mole of barium oxide is required to accomplish the same results. In general, at least 2 moles of barium hydroxide are required for every mole of $ROPSCl_2$ in the second step. So long as excess acid acceptor does not act to drive the reaction too far, the quantity of this material is limited only by the desired slurry density.

While this invention is not limited to any theory, it is believed that the differences in the required amounts of acid scavenger are attributable to the formation of different hydrates and complexes of the acid scavengers with the other materials in the reaction mixture. Since the formation of these hydrates and complexes are influenced greatly by slight changes in temperature and the proportions of the other components in the reaction mixture, it is not possible to predict precisely how much of a given acid acceptor will be required for a specific reaction. A moderate excess of acid acceptor is not harmful to the reaction since it remains as an undissolved solid in the reaction mixture. The optimum amount of acid acceptor required may be established by following the course of the reaction, for example, by using infrared or other conventional analytical techniques.

The nature of the solvent employed in the reaction mixture for the production of the dichloro-O-alkylphosphorothioate and monochloro-O,O-dialkylphosphorothioate compounds has a considerable influence on these reactions. In general, the rate of reaction increases as the polarity of the solvent increases. Generally, electron donor compounds tend to decrease the rate of the reaction whereas electrophilic solvents tend to increase the rate of reaction. Solvents characterized as electrophilic in nature, which enhance the reaction, include, for example, mono- and di-chlorobenzene; 1,2,4-trichlorobenzene; nitrobenzene; toluene; xylene; chloroform; methylene chloride; ethylene chloride; halogenated aliphatic hydrocarbons; aryl-alkyl ethers such as anisole and the like. The thiophosphoryl chloride and its mono- and di-alkoxylated chloro derivatives are particularly good solvents. The reaction rate is much slower in solvents possessing distinct electron donor characteristics. Examples of such electron donor solvents include dioxane, diethyl ether and ethylene glycol ethers. Saturated aliphatic hydrocarbons are poorer solvents for enhancing these reactions than are benzene, xylene, and the aromatics in general. The precise reasons for this phenomenon are not now known.

The reaction may be carried out in pure monochloro-O,O-dialkylphosphorothioate or pure $PSCl_3$ without producing undesirable by-products. The advantage in using either of these materials as the reaction media is that problems in the recovery, purification and recycle of solvents are totally avoided.

The quantity of solvent used in each stage of the present process is preferably kept to the minimum necessary to provide adequate mixing and dilution of the reactants. This is so because it is generally preferable to produce a relatively concentrated rather than a dilute mixture of product. In general, at least about 5% by weight of the total reaction mixture is composed of solvent. While the total percentage of solvent in the reaction mixture is not critical and can be as much as about 95% by weight of the reaction mixture, generally the quantity of solvent should not exceed about 30% by weight of the reaction mixture. The total amount of solvent in the reaction mixture is determined by such factors as, for example, the capacity of the reaction vessels, the desired concentration of product, and the cost of the solvent.

The alkanols used as the reactants in the Steps I and II of the present process, can be any of the alkanols but preferably lower alkanols containing from one to ten carbon atoms. Typical alkanols include neopentanol, methanol, ethanol, n-propanol, isopropanol, butanol, isobutanol, pentanol, octanol, and the like.

In accordance with this invention, each step of the process is preferably carried out at a neutral or preferably alkaline pH. Operating the process at an acid pH will generally result in relatively low yields and slow reaction times.

Step III of the process differs considerably from Steps I and II in that it is preferably carried out with an aqueous phase. The organic solvents and temperatures used in Step III may be the same as those used in the other two steps.

The alkali metal substituted phenate reactant used in Step III has the general formula

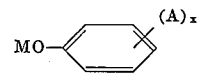

In the above formula for the alkali metal substituted phenate, M is an alkali metal, A is a radical including the nitro, methyl, chloro and carbonitrile radicals and mixtures of these radicals. The integer $x$ is indicative of the number of A radicals attached to the annular aromatic carbon atoms and can range from 1 to 4 inclusive. The term alkali metal as used hereinabove is intended to include the alkali metals sodium, potassium, cesium, rubidium and lithium.

Typical alkali metal substituted phenates include the alkali metal salts of p-nitrophenol;
2,4-dinitrophenol;
2,4-dichlorophenol;
2-hydroxy-4-nitronaphthalene;
2-methyl-4-nitrophenol;
paracresol;
2-chloro-4-nitrophenol;
4-chloro-2-nitrophenol;
2-nitro-4-methylphenol;
4-methylphenol;
2,4,6-trichlorophenol;
2,4,5-trichlorophenol;
3-chlorophenol;
4-chlorophenol;
2,5-dichlorophenol;
2,3,4,6-tetrachlorophenol;
2-methyl-4-chlorophenol;
3-methyl-4-chlorophenol;
2-chloro-6-methylphenol; and the like.

The sodium salts of these phenates are preferred.

The O-arene-(O,O-dialkyl)phosphorothioate is preferably recovered from the Step III as a solution in a polar solvent. If it is desired to isolate this reaction product from the solvent, it is possible to accomplish this isolation by conventional separation procedures such as distillation, fractional crystallization, and the like.

The present process can be utilized to produce a wide variety of toxic thiophosphate compounds including, for example, O-methyl-O-butyl-O-p-nitrophenylthiophosphate;
O-methyl-O-ethyl-O-p-nitrophenylthiophosphate;
O,O-dimethyl-O-p-nitrophenylthiophosphate;
O,O-diethyl-O-p-nitrophenylthiophosphate;
O-methyl-O-propyl-O-p-nitrophenylthiophosphate;
O-ethyl-O-propyl-O-p-nitrophenylthiophosphate; and the like.

As will be understood by those skilled in the art, what has been described are preferred embodiments of the invention, however, many modifications, changes and substitutions can be made therein without departing from the scope and the spirit of the following claims.

What is claimed is:
1. Process comprising:
  (A) admixing and reacting $PSCl_3$, ROH, in which R is an alkyl substituent, catalyst and an acid acceptor selected from the group consisting of sodium carbonate and the oxides and hydroxides of barium, lithium, calcium and magnesium to produce $ROPSCl_2$; and
  (B) reacting said $ROPSCl_2$ with ROH in which R is an alkyl substituent, and an acid acceptor, to produce $(RO)_2PSCl$;
  (C) reacting said $(RO)_2PSCl$ with an alkali metal substituted phenate and;
  (D) recovering O-arene-O,O-dialkylphosphorothioate.
2. Process comprising:
  (A) admixing and reacting $PSCl_3$, ROH, in which R is an alkyl substituent, catalyst and an acid acceptor selected from the group consisting of sodium carbonate and the oxides and hydroxides of barium, lithium, calcium and magnesium, to produce $ROPSCl_2$; and
  (B) reacting said $ROPSCl_2$ with ROH in which R is an alkyl substituent, and an acid acceptor; and
  (C) recovering $(RO)_2PSCl$.
3. Process comprising:
  (A) admixing and reacting $PSCl_3$, ROH, in which R is an alkyl substituent, catalyst and an acid acceptor selected from the group consisting of sodium carbonate and the oxides and hydroxides of barium, lithium, calcium and magnesium; and
  (B) recovering $ROPSCl_2$.
4. Process comprising
preparing a mixture of $PSCl_3$ and an acid acceptor selected from the group consisting of sodium carbonate and the oxides and hydroxides of barium, lithium, calcium and magnesium;
reacting said mixture with an alkanol in a polar solvent containing a catalytic amount of an electron donor catalyst;
and recovering dichloro-O-alkylphophorothioate.
5. Process which comprises the steps of
admixing and reacting dichloro-O-alkylphosphorothioate with alkanol and barium hydroxide, in a polar solvent; and
recovering chloro-O,O-dialkylphosphorothioate.
6. Process which comprises the steps of
preparing a mixture comprising $PSCl_3$, a polar solvent containing an electron donor catalyst, and an acid acceptor selected from the group consisting of sodium carbonate and the oxides and hydroxides of barium, lithium, calcium and magnesium;
reacting said mixture with an alkanol to produce dichloro-O-alkylphosphorothioate;
reacting said dichloro-O-alkylphosphorothioate with an alkanol and barium hydroxide in a polar solvent to produce a substantially water-immiscible mixture of chloro-O,O-dialkylphosphorothioate in polar solvent;
contacting said water-immiscible mixture with an aqueous phase containing an alkali-metal substituted phenate having the formula:

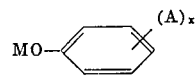

wherein M is an alkali forming metal, A is a radical selected from the group consisting of nitro, methyl, chloro, carbonitrile and mixtures thereof, and $x$ is an integer ranging from 1 to 4 inclusive and is indicative of the number of A radicals in said phenate; and
recovering O-arene-O,O-dialkylphosphorothioate.
7. Process comprising
preparing a mixture of $PSCL_3$ and CaO;
reacting said mixture with methanol in xylene containing a catalytic amount of acridine;
recovering dichloro-O,O-methylphosphorothioate.
8. Process comprising
preparing a mixture of $PSCl_3$ and $Ca(OH)_2$;
reacting said mixture with methanol in xylene containing a catalytic amount of acridine;
recovering dichloro-O,O-methylphosphorothioate.
9. Process comprising
preparing a mixture of $PSCl_3$ and CaO;
reacting said mixture with methanol in $(CH_3O)_2PSCl$ containing a catalytic amount of acridine;
recovering dichloro-O,O-methylphosphorothioate.
10. Process comprising
preparing a mixture of $PSCl_3$ and $Ca(OH)_2$;
reacting said mixture with methanol in $(CH_3O)_2PSCl$ containing a catalytic amount of acridine;
recovering dichloro-O,O-methylphosphorothioate.
11. Process comprising
preparing a mixture of $PSCl_3$ and an acid acceptor selected from the group consisting of sodium carbonate and the oxides and hydroxides of barium, lithium, calcium and magnesium;
reacting said mixture with an alkanol in xylene containing a catalytic amount of an electron donor catalyst;
and recovering dichloro-O-alkylphosphorothioate.
12. Process comprising
preparing a mixture of $PSCl_3$ and an acid acceptor selected from the group consisting of sodium carbonate and the oxides and hydroxides of barium, lithium, calcium and magnesium;
reacting said mixture with an alkanol in a polar solvent containing a catalytic amount of acridine;
and recovering dichloro-O-alkylphosphorothioate.
13. Process comprising
preparing a mixture of $PSCl_3$ and an acid acceptor selected from the group consisting of sodium carbonate and the oxides and hydroxides of barium, lithium, calcium and magnesium;
reacting said mixture with an alkanol in $(CH_3O)_2PSCl$ containing a catalytic amount of an electron donor catalyst;
and recovering dichloro-O-alkylphosphorothioate.
14. Process comprising
preparing a mixture of $PSCl_3$ and an acid acceptor selected from the group consisting of sodium carbonate and the oxides and hydroxides of barium, lithium, calcium and magnesium;
reacting said mixture with an alkanol in a polar solvent containing a catalytic amount of quinoline;
and recovering dichloro-O-alkylphosphorothioate.
15. Process comprising
preparing a mixture of $PSCl_3$ and sodium carbonate;
reacting said mixture with an alkanol in a polar solvent containing a catalytic amount of an electron donor catalyst;
and recovering dichloro-O-alkylphosphorothioate.
16. Process comprising
preparing a mixture of $PSCl_3$ and calcium oxide;
reacting said mixture with an alkanol in a polar solvent containing a catalytic amount of an electron donor catalyst;
and recovering dichloro-O-alkylphosphorothioate.

17. Process comprising
preparing a mixture of $PSCl_3$ and an acid acceptor selected from the group consisting of sodium carbonate and the oxides and hydroxides of barium, lithium, calcium and magnesium;
reacting said mixture with an alkanol in nitrobenzene containing a catalytic amount of an electron donor catalyst;
and recovering dichloro-O-alkylphosphorothioate.

18. Process comprising
preparing a mixture of $PSCl_3$ and calcium hydroxide;
reacting said mixture with an alkanol in a polar solvent containing a catalytic amount of an electron donor catalyst;
and recovering dichloro-O-alkylphosphorothioate.

19. Process comprising
preparing a mixture of $PSCl_3$ and magnesium oxide;
reacting said mixture with an alkanol in a polar solvent containing a catalytic amount of an electron donor catalyst;
and recovering dichloro-O-alkylphosphorothioate.

20. Process which comprises the steps of
admixing and reacting $CH_3OPSCl_2$, methanol and $Ba(OH)_2$ in a xylene solution;
and recovering chloro-O,O-dimethylphosphorothioate.

References Cited

UNITED STATES PATENTS 2,692,891  10/1954  Young et al. _____ 260—975 X

CHARLES B. PARKER, *Primary Examiner.*

A. H. SUTTO, *Assistant Examiner.*